United States Patent
Babal

(10) Patent No.: US 11,666,034 B2
(45) Date of Patent: Jun. 6, 2023

(54) MAT FOR BOWLS

(71) Applicant: Prashant Babal, Hopkins, MN (US)

(72) Inventor: Prashant Babal, Hopkins, MN (US)

(73) Assignee: Wazir Chand Handicrafts, Moradabad (IN)

( * ) Notice: Subject to any disclaimer, the term of this patent is extended or adjusted under 35 U.S.C. 154(b) by 0 days.

(21) Appl. No.: 16/805,993

(22) Filed: Mar. 2, 2020

(65) Prior Publication Data

US 2021/0267162 A1   Sep. 2, 2021

(51) Int. Cl.
*A01K 5/01* (2006.01)
*A01K 7/00* (2006.01)

(52) U.S. Cl.
CPC .......... *A01K 5/0135* (2013.01); *A01K 7/005* (2013.01)

(58) Field of Classification Search
CPC .... A01K 5/0135; A01K 7/005; A01K 5/0114; A01K 7/00; A47G 19/02
USPC .................. 119/61.5, 61.54, 61.57
See application file for complete search history.

(56) References Cited

U.S. PATENT DOCUMENTS

| | | | |
|---|---|---|---|
| 5,053,262 A | 10/1991 | Kerr | |
| 6,516,747 B1* | 2/2003 | Willinger | A01K 5/0114 119/61.54 |
| 8,251,340 B2* | 8/2012 | Webb | A47G 29/093 248/683 |
| 8,684,218 B1 | 4/2014 | Stravitz | |
| 9,462,903 B2 | 10/2016 | Laurain | |
| 10,349,623 B1* | 7/2019 | Stygstra | A01K 5/00 |
| 2003/0152736 A1 | 8/2003 | Bass | |
| 2005/0056642 A1 | 3/2005 | Lion | |
| 2011/0114656 A1* | 5/2011 | Tupy | A47G 23/0241 220/729 |
| 2017/0086423 A1* | 3/2017 | Wall | A01K 5/0135 |
| 2017/0208774 A1* | 7/2017 | Kasper | A01K 7/005 |
| 2018/0343826 A1* | 12/2018 | Kumar | A01K 5/0135 |
| 2018/0368594 A1* | 12/2018 | Hakim | F16B 47/00 |

FOREIGN PATENT DOCUMENTS

| | | | | |
|---|---|---|---|---|
| CA | 2170688 A1 * | 9/1996 | | A01K 5/0135 |
| EP | 3603386 A1 * | 2/2020 | | A01K 7/005 |

OTHER PUBLICATIONS

Pure and Applied Chemistry, vol. 79, No. 10 (Jan. 1, 2009), pp. 1801-1829, 1810. (Year: 2009).*

* cited by examiner

*Primary Examiner* — Peter M Poon
*Assistant Examiner* — Carly W. Lynch
(74) *Attorney, Agent, or Firm* — Brooks, Cameron & Huebsch, PLLC

(57) ABSTRACT

A mat for bowls is described herein. A mat can include a planar portion, a shell structure, and an extension member shaped to form a cavity in the mat, where the cavity is to cause a partial vacuum in response to the mat being in contact with an underlying surface such that lateral displacement of the mat is restricted when in contact with the underlying surface.

9 Claims, 13 Drawing Sheets

US 11,666,034 B2

MAT FOR BOWLS

TECHNICAL FIELD

The present disclosure relates to a mat for bowls.

BACKGROUND

Bowls can be utilized to provide food and/or liquids for consumption. For example, an animal such as a dog may eat out of a food bowl and/or drink water out of a water bowl.

Such bowls may be made available as a pair to an animal using a mat. The mat can keep the bowls in proximity with one another. For example, the mat may allow for an animal to have access to food and/or water in close proximity. Further, keeping the bowls in proximity with each other can allow for a caretaker of the animal to easily locate the bowls for cleaning, refilling with food and/or water, etc.

DETAILED DESCRIPTION

Figure 1:
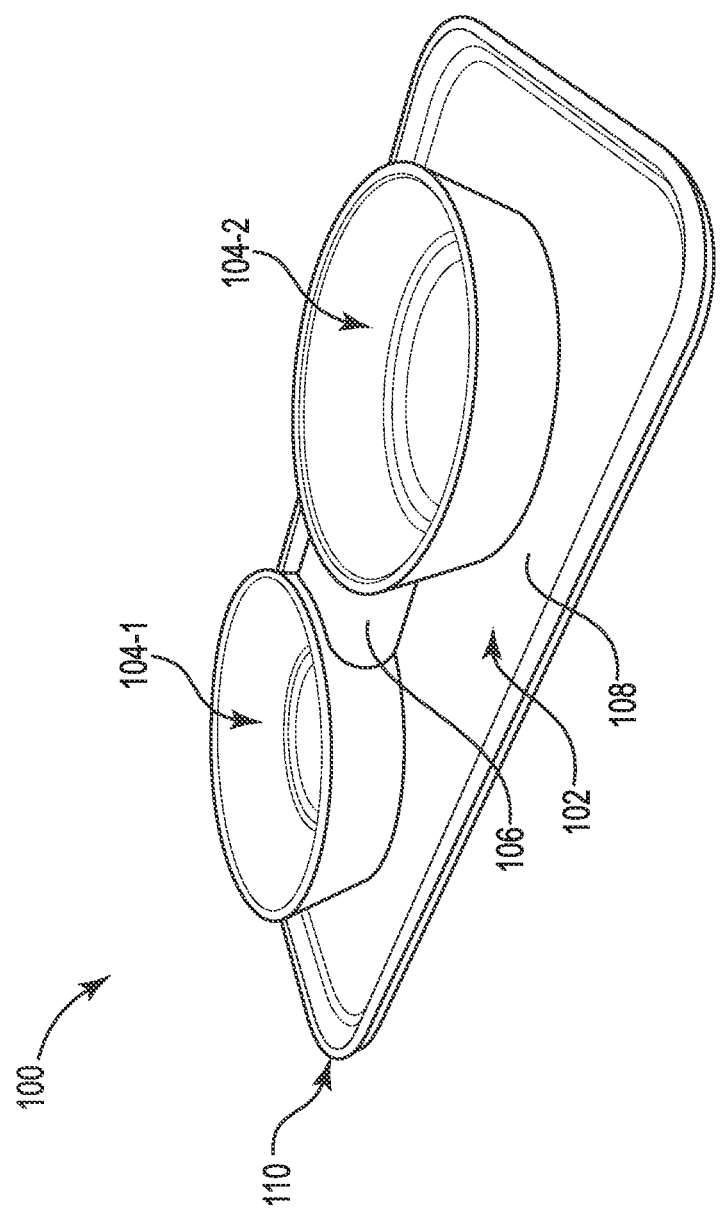
FIG. 1 is an example of a perspective view of a mat for bowls in accordance with one or more embodiments of the present disclosure.

Embodiments of a mat for bowls are described herein. For example, one or more embodiments can include a planar portion, a first shell structure, a second shell structure, and an extension member shaped to form a cavity in the mat between the planar portion, the first shell structure, and the second shell structure, where the cavity is to cause a partial vacuum in response to the mat being in contact with an underlying surface such that lateral displacement of the mat is restricted when in contact with the underlying surface.

A standalone bowl can be easily pushed around by an animal that is eating or drinking from the bowl. For example, a bowl including food may slide along a floor or other surface while a dog eats food from the bowl. Therefore, it can be advantageous to locate the bowl in a mat.

A mat can secure a bowl (or bowls) such that an animal is unable to push the bowl around on a floor or other surface. Further, a mat can provide protection to the floor or other surface from food that has fallen out of the bowl, spills, etc. However, the mat itself may slide along the floor or other surface while an animal eats or drinks from the bowl(s) secured by the mat.

In contrast, a mat for bowls in accordance with the present disclosure can secure itself to an underlying surface, reducing movement of the mat and/or the bowls. For instance, a mat for bowls, according to the disclosure, can include a cavity. The cavity can cause a partial vacuum to secure the mat to an underlying surface on which the mat is located. The partial vacuum can restrict lateral and/or vertical displacement of the mat, preventing the mat (e.g., and the bowl(s)) from sliding and/or otherwise being moved around on or from the floor or other surface which the mat is located upon. Accordingly, the mat for bowls can prevent the mat and/or bowl(s) from being moved from its location on the floor or other surface, preventing spills and/or an animal caretaker from having to locate the mat and/or bowl(s).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to."

Directional terms such as "upper", "lower", "downward", "upward", "horizontal", "vertical", "lateral", "vertical" are used with reference to the component orientation depicted in the Figures. These terms are used for example purposes only and are not intended to limit the scope of the appended claims.

The figures herein follow a numbering convention in which the first digit or digits correspond to the drawing figure number, and the remaining digits identify an element or component in the drawing. Similar elements or components between different figures may be identified by the use of similar digits. For example, 102 may reference element "02" in FIG. 1, and a similar element may be referenced as 202 in FIG. 2.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

FIG. 1 is an example of a perspective view of a mat 100 for bowls in accordance with one or more embodiments of the present disclosure. As shown in FIG. 1, the mat 100 can include a planar portion 102, a first shell structure 104-1, a second shell structure 104-2, an extension member 106, and a top surface 108. The planar portion 102 can include a raised perimeter 110.

As illustrated in FIG. 1, the mat 100 can include a planar portion 102. As used herein, the term "mat" refers to a piece of material located on a surface. For example, the mat 100 can be a piece of material located on a floor, where the mat can secure a bowl for consumption of food, liquid (e.g., water), among other examples. As used herein, the term "planar portion" refers to a portion of a piece of material that is level or substantially level. For example, the planar portion 102 of the mat 100 can be level or substantially level. As used herein, the term "substantially" intends that the characteristic does not have to be absolute but is close enough so as to achieve the characteristic. For example, "substantially level" is not limited to absolute level. For instance, the planar portion 102 can be within 0.5°, 1°, 2°, 5°, 10°, etc. of absolutely level (e.g., relative to another surface, such as an underlying surface on which the mat 100 is located, as is further described in connection with FIG. 8).

As illustrated in FIG. 1, the planar portion 102 can be in the shape of a rectangle with rounded corners. However, embodiments of the present disclosure are not so limited. For example, the planar portion 102 can be a square shape, triangular shape, circle shape, bone shape, irregular shape, and/or any other shape.

The mat 100 can be of a material that is resistant to physical deterioration when subjected to use. For example, the mat 100 can be a silicone material, a polymer material, and/or a plastic material. However, embodiments of the present disclosure are not limited to a silicone material, polymer material, and/or a plastic material. For example, the mat 100 can be any other type of material that is resistant to physical deterioration, non-toxic, and/or non-permeable.

The planar portion 102 can include a raised perimeter 110. As used herein, the term "perimeter" refers to a border of an object. For example, the raised perimeter 110 can be the border of the planar portion 102. The perimeter can be raised relative to the rest of the area of the planar portion 102. For example, the raised perimeter 110 can be at a height that is higher than the planar portion 102. The raised perimeter 110 can prevent food, liquids, etc. from contacting an underlying surface the mat 100 is located on if the food/liquid is spilled from a bowl located in the first shell structure 104-1 and/or the second shell structure 104-2, as is further described herein.

The raised perimeter 110 can be concave in shape. As used herein, the term "concave" refers to material that is curved. For example, the raised perimeter 110 can include a shape that is curved "upwards" (e.g., relative to an underlying surface the mat 100 is located on) and "inwards" (e.g., towards the first shell structure 104-1 and/or the second shell structure 104-2). The concave shape of the raised perimeter 110 can provide additional protection from food and/or liquid spilled from a bowl located in the first shell structure 104-1 and/or the second shell structure 104-2, as is further described herein. For example, food and/or liquid spilled from a bowl located in the first shell structure 104-1 and/or the second shell structure 104-2 onto the planar portion 102 can remain on the planar portion 102 as a result of the raised perimeter 110 preventing food from rolling off of the planar portion 102 and/or liquid from running off of the planar portion 102.

As illustrated in the perspective view of FIG. 1, the mat 100 can include a top surface 108. For example, in the perspective orientation of the mat 100 in FIG. 1, the top surface 108 can be a surface that is a higher surface than that of a bottom surface (e.g., as is further described in connection with FIGS. 6 and 7) of the planar portion 102 of the mat 100. The top surface 108 can include a matte finish. However, embodiments of the present disclosure are not so limited. For example, the top surface 108 can include a glossy finish (e.g., a shiny finish), a semi-glossy finish, etc, among other types of finishes.

The mat 100 can include a first shell structure 104-1. As used herein, the term "shell structure" refers to a concave exterior covering that defines a basin including a depression. For example, the first shell structure 104-1 can include a concave exterior wall that defines a basin into which a bowl can be received, as is further described herein. The concave exterior wall can be at an angle that is greater than 90° relative to a base of the first shell structure 104-1 (e.g., 120°). However, embodiments of the present disclosure are not so limited. For example, the first shell structure 104-1 can include an exterior wall that is at an angle of 90° relative to the base of the first shell structure 104-1.

As illustrated in FIG. 1, the first shell structure 104-1 is shaped as a circle. However, embodiments of the present disclosure are not so limited. For example, the first shell structure 104-1 can be shaped as a square, rectangle, triangle, oval, an irregular shape, and/or any other shape.

The first shell structure 104-1 can be continuously connected to the top surface 108 of the mat 100. As used herein, the term "continuously connected" refers to a state of being joined together in an uninterrupted fashion along a particular direction. For example, a bottom portion of the concave exterior wall that defines the first shell structure 104-1 can be continuously connected to the top surface 108 of the mat 100 (e.g., circumferentially). Further, a portion of the first shell structure 104-1 can define a portion of a cavity, as is further described herein and in connection with FIGS. 6 and 7.

The first shell structure 104-1 can be shaped to receive a first bowl (e.g., not illustrated in FIG. 1). For example, as illustrated in FIG. 1, the first shell structure 104-1 can be a shape defined by a concave exterior wall that defines a basin. The first bowl can accordingly be of a shape defined by a concave exterior wall that defines a basin such that the first bowl can be located in the first shell structure 104-1. In other words, the concave exterior wall of the bowl can be at an angle relative to the base of the bowl (e.g., 120°) that is the same angle between a base of the first shell structure 104-1 and the concave exterior wall of the first shell structure 104-1 (e.g., 120°).

Although the angle between the concave exterior wall and the base of the first shell structure 104-1 and angle between the concave exterior wall and the base of the bowl to be located in the first shell structure 104-1 are described above as both being 120°, embodiments of the present disclosure are not so limited. For example, the angle between the concave exterior wall and the base of the first shell structure 104-1 and angle between the concave exterior wall and the base of the bowl to be located in the first shell structure 104-1 can be any angle between 90° and 180°.

The first shell structure 104-1 can be a silicone material, a polymer material, and/or a plastic material. However, embodiments of the present disclosure are not limited to a silicone material, polymer material, and/or a plastic material. For example, the first shell structure 104-1 can be any other type of material that is resistant to physical deterioration, non-toxic, and/or non-permeable.

In some examples, the first bowl can receive food. For example, the first bowl can receive food such that an animal can eat the food from the first bowl. In some examples, the first bowl can receive liquid. For example, the first bowl can receive water or other liquids such that an animal can drink the liquid from the first bowl.

In some examples, the first bowl can be a stainless-steel material. However, embodiments of the present disclosure are not so limited. For example, the first bowl can be a plastic material, a polymer material, and/or any other material that can be resistant to physical deterioration, non-toxic, and/or non-permeable.

The mat 100 can include a second shell structure 104-2. For example, the second shell structure 104-2 can include a concave exterior wall that defines a basin into which a bowl can be received, as is further described herein. The concave exterior wall can be at an angle that is greater than 90° relative to a base of the first shell structure 104-1 (e.g., 120°). However, embodiments of the present disclosure are not so limited. For example, the second shell structure 104-2 can include an exterior wall that is at an angle of 90° relative to the base of the second shell structure 104-2.

As illustrated in FIG. 1, the second shell structure 104-2 is shaped as a circle. However, embodiments of the present disclosure are not so limited. For example, the second shell structure 104-2 can be shaped as a square, rectangle, triangle, oval, an irregular shape, and/or any other shape.

The second shell structure 104-2 can be continuously connected to the top surface 108 of the mat 100. For example, a bottom portion of the concave exterior wall that defines the second shell structure 104-2 can be continuously connected to the top surface 108 of the mat 100 (e.g., circumferentially). Further, a portion of the second shell structure 104-2 can define a portion of a cavity, as is further described herein and in connection with FIGS. 6 and 7.

The second shell structure 104-2 can be shaped to receive a second bowl (e.g., not illustrated in FIG. 1). For example, as illustrated in FIG. 1, the second shell structure 104-2 can be a shape defined by a concave exterior wall that defines a basin. The second bowl can accordingly be of a shape defined by a concave exterior wall that defines a basin such that the second bowl can be located in the second shell structure 104-2. In other words, the concave exterior wall of the bowl can be at an angle relative to the base of the bowl (e.g., 120°) that is the same angle between a base of the second shell structure 104-2 and the concave exterior wall of the second shell structure 104-2 (e.g., 120°).

Although the angle between the concave exterior wall and the base of the second shell structure 104-2 and angle between the concave exterior wall and the base of the bowl to be located in the second shell structure 104-2 are described above as both being 120°, embodiments of the present disclosure are not so limited. For example, the angle between the concave exterior wall and the base of the second shell structure 104-2 and angle between the concave exterior wall and the base of the bowl to be located in the second shell structure 104-2 can be any angle between 90° and 180°.

The second shell structure 104-2 can be a silicone material, a polymer material, and/or a plastic material. However, embodiments of the present disclosure are not limited to a silicone material, polymer material, and/or a plastic material. For example, the second shell structure 104-2 can be any other type of material that is resistant to physical deterioration, non-toxic, and/or non-permeable.

In some examples, the second bowl can receive food. For example, the second bowl can receive food such that an animal can eat the food from the second bowl. In some examples, the second bowl can receive liquid. For example, the second bowl can receive water or other liquids such that an animal can drink the liquid from the second bowl.

In some examples, the second bowl can be a stainless-steel material. However, embodiments of the present disclosure are not so limited. For example, the second bowl can be a plastic material, a polymer material, and/or any other material that can be resistant to physical deterioration, non-toxic, and/or non-permeable.

As illustrated in FIG. 1, the first shell structure 104-1 and the second shell structure 104-2 are shaped as circles. However, embodiments of the present disclosure are not so limited. For example, the first shell structure 104-1 and the second shell structure 104-2 can be shaped as squares, rectangles, triangles, ovals, irregular shapes, and/or any other shape. Further, the first shell structure 104-1 and the second shell structure 104-2 can be differently shaped from each other (e.g., the first shell structure 104-1 is shaped as a square and the second shell structure 104-2 is shaped as a circle, etc.).

The mat 100 can include an extension member 106. As used herein, the term "member" refers to a constituent part of a structural whole. For example, extension member 106 can be a structural member of the mat 100. The extension member 106 can be a continuous extension of material between the first shell structure 104-1, the second shell structure 104-2, and the planar portion 102 of the mat 100.

The extension member 106 can form a cavity in the mat 100 between the planar portion 102, the first shell structure 104-1, and the second shell structure 104-2. As used herein, the term "cavity" refers to a hollow space within a body. For example, the cavity can be a hollow space between the planar portion 102, the first shell structure 104-1, and the second shell structure 104-2. The cavity can cause a partial vacuum in response to the mat 100 being in contact with an underlying surface such that lateral displacement of the mat is restricted when in contact with the underlying surface, as is further described in connection with FIGS. 6-8.

The planar portion 102, the first shell structure 104-1, the second shell structure 104-2, and the extension member 106 can be of a single continuous and unitary material. For example, the planar portion 102, the first shell structure 104-1, the second shell structure 104-2, and the extension member 106 can be a silicone material, a polymer material, a plastic material, and/or any other type of material that is resistant to physical deterioration, non-toxic, and/or non-permeable that can be fabricated as a whole. For instance, the mat 100, including the planar portion 102, the first shell structure 104-1, the second shell structure 104-2, and the extension member 106, can be of a material that can be injection molded, blow molded, thermoformed, transfer molded, compression molded, extruded, three-dimensionally (3D) printed, etc. to produce a mat 100 that is of a single continuous and unitary material.

Figure 2:
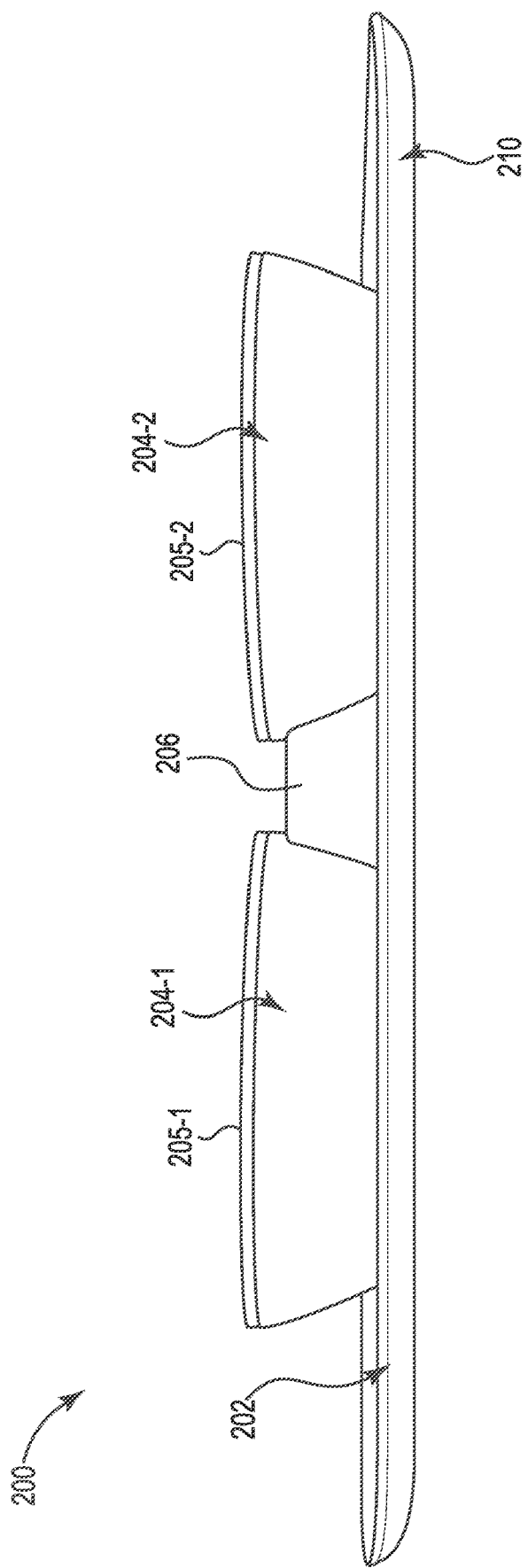
FIG. 2 is an example of a side view of a mat for bowls in accordance with one or more embodiments of the present disclosure.

FIG. 2 is an example of a side view of a mat 200 for bowls in accordance with one or more embodiments of the present disclosure. As shown in FIG. 2, the mat 200 can include a planar portion 202, a first shell structure 204-1 having a first bowl 205-1 located therein, a second shell structure 204-2 having a second bowl 205-2 located therein, and an extension member 206. The planar portion 202 can include a raised perimeter 210.

As illustrated in FIG. 2, the mat 200 can include a first shell structure 204-1. The first shell structure 204-1 can be continuously connected to the planar portion 202 and have the first bowl 205-1 located therein. The mat 200 can include a second shell structure 204-2. The second shell structure 204-2 can be continuously connected to the planar portion 202 and have the second bowl 205-2 located therein.

The extension member 206 can be continuously connected to the planar portion 202, the first shell structure 204-1, and the second shell structure 204-2. The extension member 206 can be shaped to form a cavity in the mat 200 between the planar portion 202, the first shell structure 204-1, and the second shell structure 204-2, as is further described in connection with FIGS. 6-8.

Figure 3:
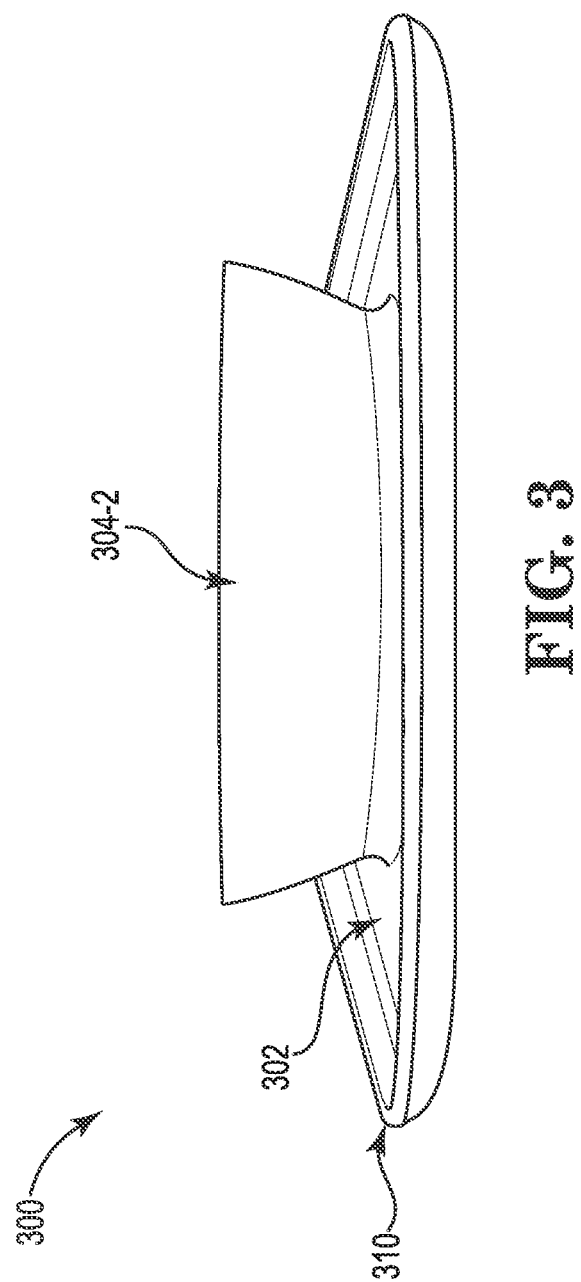
FIG. 3 is an example of another side view of a mat for bowls in accordance with one or more embodiments of the present disclosure.

FIG. 3 is an example of another side view of a mat 300 for bowls in accordance with one or more embodiments of the present disclosure. As shown in FIG. 3, the mat 300 can include a planar portion 302 and a second shell structure 304-2. The planar portion 302 can include a raised perimeter 310. The mat 300 can include the second shell structure 304-2. The second shell structure 304-2 can be continuously connected to the planar portion 302.

Figure 4:
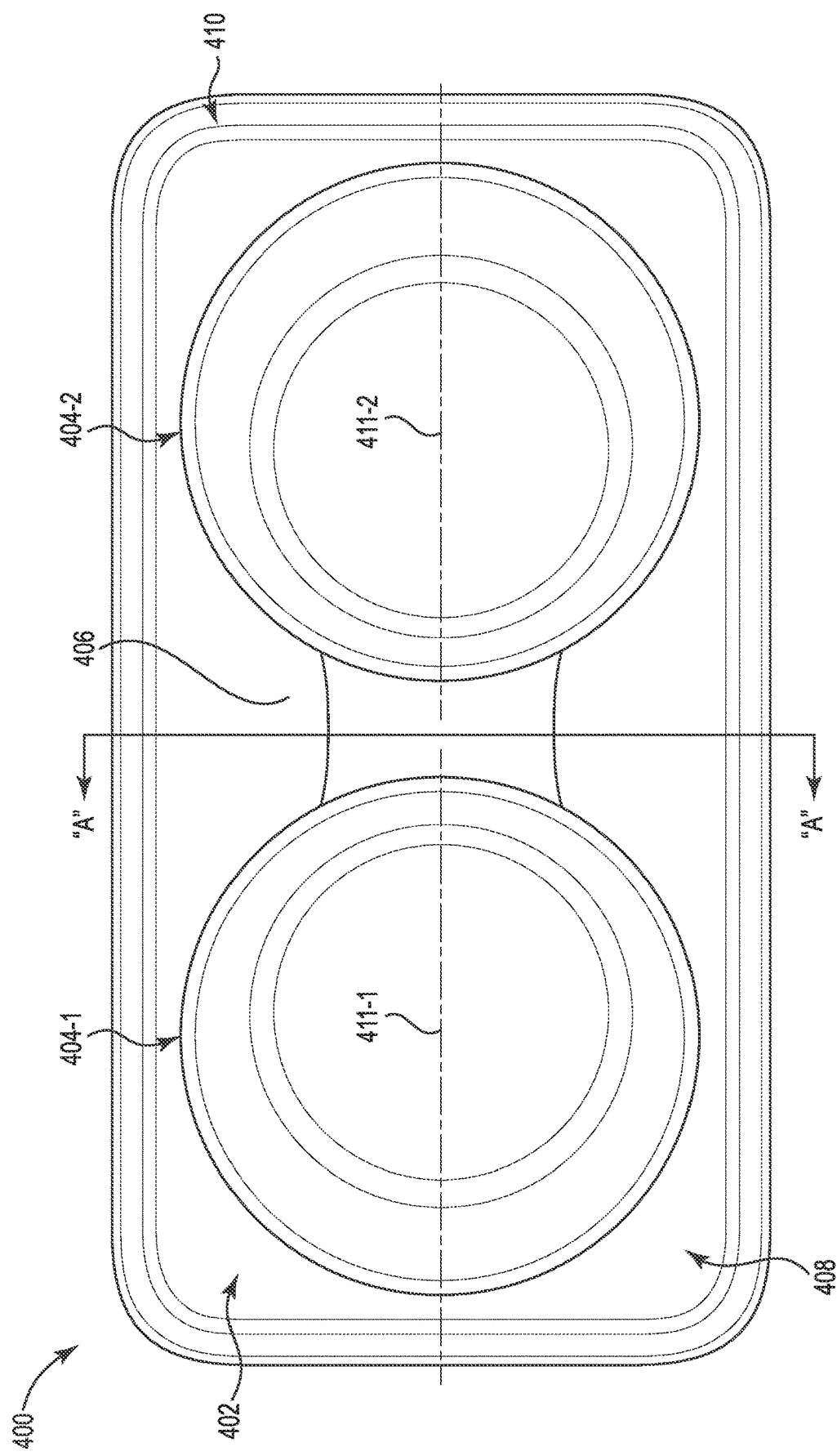
FIG. 4 is an example of a top view of a mat for bowls in accordance with one or more embodiments of the present disclosure.

FIG. 4 is an example of a top view of a mat 400 for bowls in accordance with one or more embodiments of the present disclosure. As shown in FIG. 4, the mat 400 can include a planar portion 402, a first shell structure 404-1, a second shell structure 404-2, an extension member 406. The planar portion 402 can include a raised perimeter 410. The first shell structure 404-1 can include axis 411-1. The second shell structure 404-2 can include axis 411-2.

As illustrated in FIG. 4, the mat 400 can include a first shell structure 404-1. The first shell structure 204-1 can be continuously connected to the planar portion 402. The mat 400 can include a second shell structure 404-2. The second shell structure 404-2 can be continuously connected to the planar portion 402.

The extension member 406 can be continuously connected to the planar portion 402, the first shell structure 404-1, and the second shell structure 404-2. As illustrated in FIG. 4, when viewed from the top, the extension member 406 can be of a curvilinear rectangle shape (e.g., a rectangle with inwardly curved sides). However, embodiments of the present disclosure are not so limited. For example, the two sides of the extension member 406 connected to the planar portion 402 can be straight or substantially straight such that they are parallel or substantially parallel, respectively, with the raised perimeter 410 of the planar portion 402.

The extension member 406 can be shaped to form a cavity in the mat 200 between the planar portion 202, the first shell structure 204-1, and the second shell structure 204-2, as is further described in connection with FIGS. 6-8.

As illustrated in FIG. 4, the first shell structure 404-1 and the second shell structure 404-2 are oriented on the mat 400 in a manner such that an axis 411-1 of the first shell structure 404-1 and an axis 411-2 of the second shell structure 404-2 are co-linear. However, embodiments of the present disclosure are not so limited. For example, the first shell structure 404-1 and the second shell structure 404-2 can be oriented on the mat 400 in any other manner (e.g., such that the axes 411-1 and 411-2 are not co-linear). In other words, the first shell structure 404-1 and the second shell structure 402-2 can be oriented on the mat 400 such that the axes 411-1 and 411-2 are offset from each other (e.g. and are not co-linear).

Figure 5:
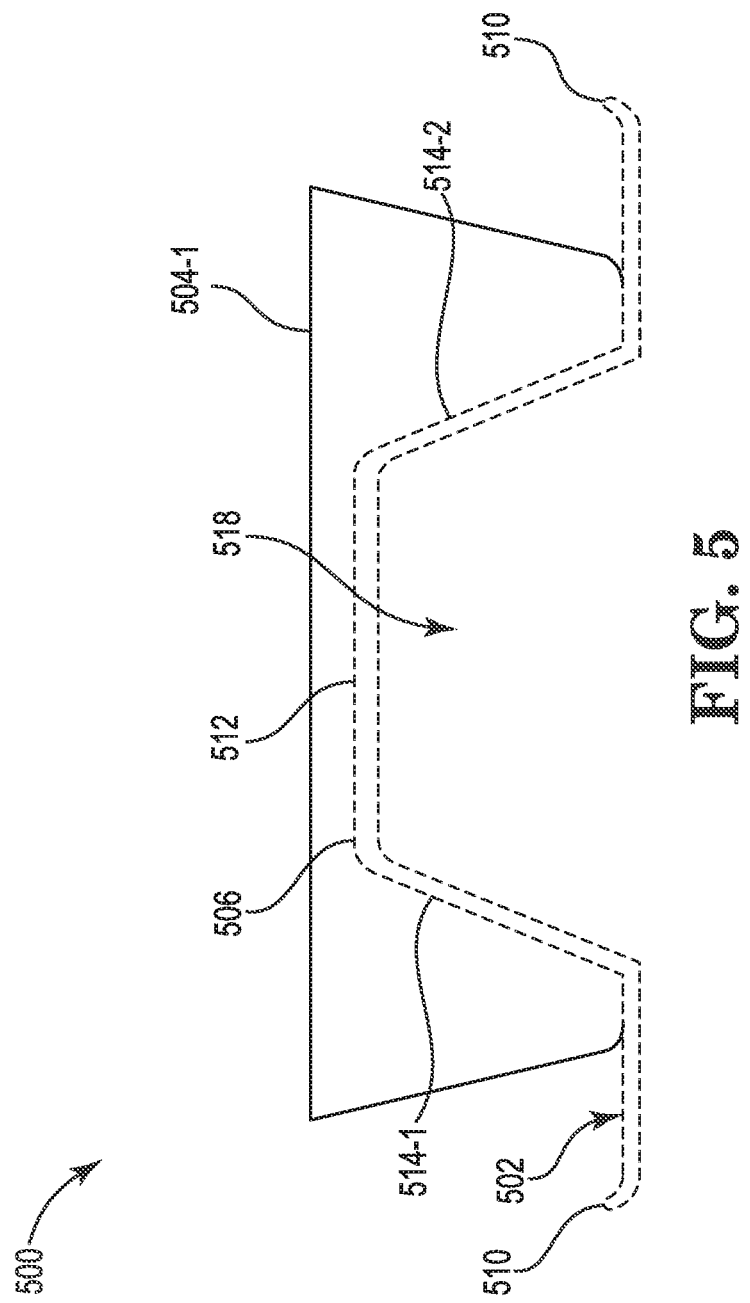
FIG. 5 is an example of a cross-sectional view of a mat for bowls in accordance with one or more embodiments of the present disclosure, taken through the line "A-A" of FIG. 4.

FIG. 5 is an example of a cross-sectional view of a mat 500 for bowls in accordance with one or more embodiments of the present disclosure, taken through the line "A-A" of FIG. 4. As shown in FIG. 5, the mat 500 can include a planar portion 502, a first shell structure 504-1, and an extension member 506. The planar portion 502 can include a raised perimeter 510. The extension member 506 can include a top portion 512, a first side portion 514-1, and a second side portion 514-2. The dashed lines illustrated in FIG. 5 indicate the point at which the line "A-A" bisects the mat 500 (e.g., as previously illustrated in FIG. 4).

As illustrated in FIG. 5, the extension member 506 includes a top portion 512, a first side portion 514-1, and a second side portion 514-2. The top portion 512, the first side portion 514-1, and the second side portion 514-2 can define the shape of the extension member 512, as is further described herein.

The top portion 512 can be continuously connected to the first side portion 514-1 and the second side portion 514-2. The top portion 512, the first side portion 514-1, and the second side portion 514-2 can be a continuous extension of material that defines the extension member 506.

As illustrated in FIG. 5, the first side portion 514-1 is oriented at an obtuse angle relative to the top portion 512 of the extension member 506. For example, the first side portion 514-1 is oriented at an angle greater than 90° relative to the top portion 512. Additionally, the second side portion 514-2 is oriented at an obtuse angle relative to the top portion 512 of the extension member 506. For example, the second side portion 514-2 is oriented at an angle greater than 90° relative to the top portion 512.

Although the first side portion 514-1 and the second side portion 514-2 are described above as being oriented at obtuse angles relative to the top portion 512, embodiments of the present disclosure are not so limited. For example, the first side portion 514-1 and the second side portion 514-2 can be oriented at right angles relative to the top portion 512 or at acute angles relative to the top portion 512. Further, the first side portion 514-1 can be oriented at an angle relative to the top portion 512 that is a different angle than that of the second side portion 514-2 relative to the top portion 512. Further, the first side portion 514-1 can be oriented at an angle relative to the top portion 512 that is a different angel than that of the second side portion 514-2 relative to the top portion 512.

The top portion 512, the first side portion 514-1, and the second side portion 514-2 can define the shape of the extension member 506. The resulting shape of the extension member 506, along with the first shell structure 504-1 and the second shell structure (e.g., not illustrated in FIG. 5) can define the cavity 518. The cavity 518 can cause a partial vacuum in response to the mat 500 being in contact with an underlying surface such that lateral displacement of the mat is restricted when in contact with the underlying surface, as is further described in connection with FIGS. 6-8.

Figure 6:
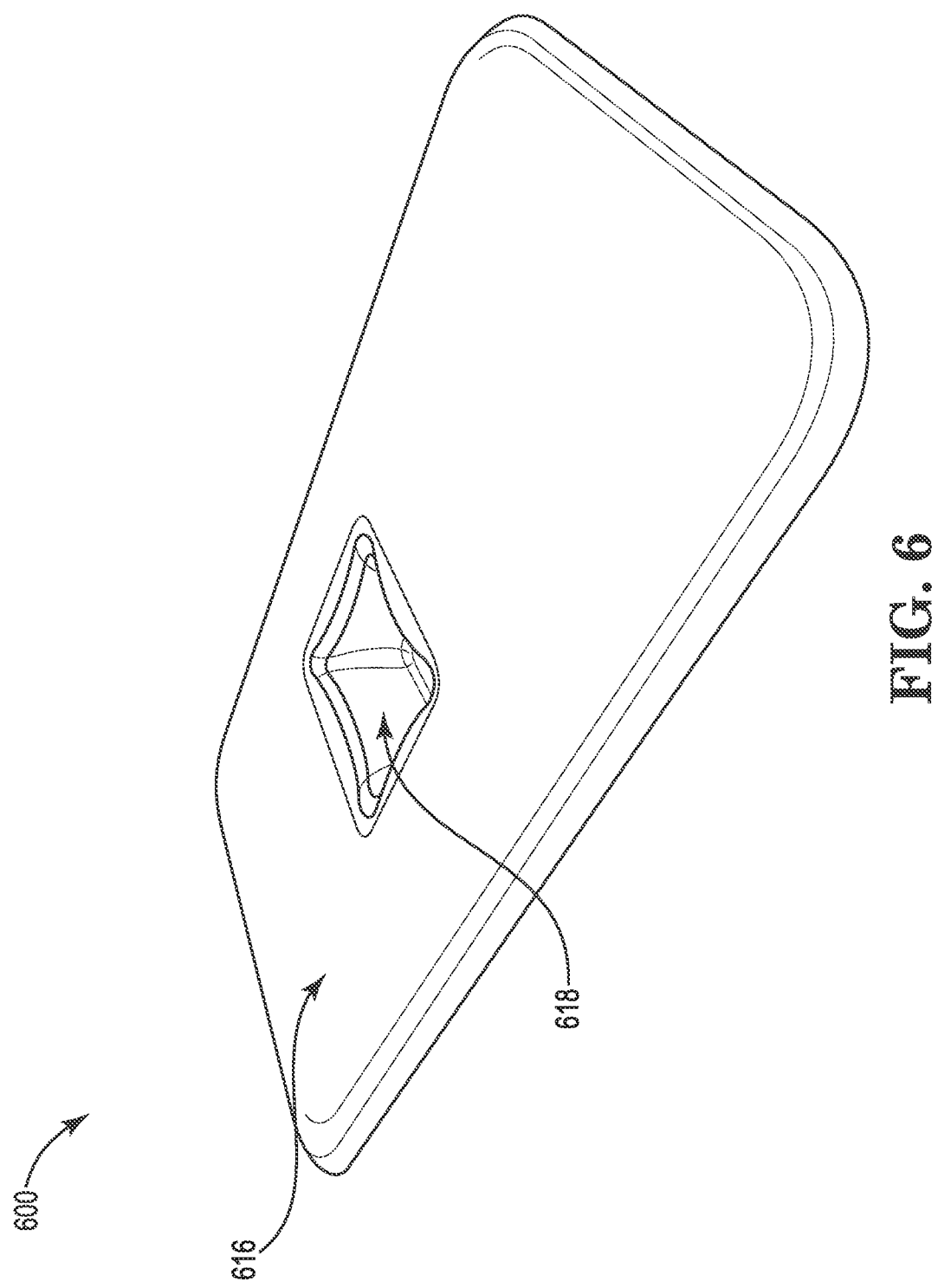
FIG. 6 is an example of a perspective view of a bottom surface of a mat for bowls in accordance with one or more embodiments of the present disclosure.

FIG. 6 is an example of a perspective view of a bottom surface 616 of a mat 600 for bowls in accordance with one or more embodiments of the present disclosure. As shown in FIG. 6, the mat 600 can include a bottom surface 616 and a cavity 618. As illustrated in the perspective view of FIG. 6, the mat 600 can include a bottom surface 616. For example, in the perspective orientation of the mat 600 in FIG. 6, the bottom surface 616 can be a surface that is a lower surface than that of the top surface (e.g., top surface 108, 408, previously described in connection with FIGS. 1 and 4, respectively) of the planar portion of the mat 600. The bottom surface 616 can include a glossy finish (e.g., a shiny finish), a semi-glossy finish, etc. However, embodiments of the present disclosure are not so limited. For example, the bottom surface 616 can include a matte finish, among other types of finishes.

As previously described in connection with FIG. 1, the extension member can be continuously connected to a top surface of the mat 600 to form the cavity 618. The cavity 618 can create a partial vacuum when the bottom surface 616 is in contact with an underlying surface, as is further described in connection with FIG. 8.

Figure 7:
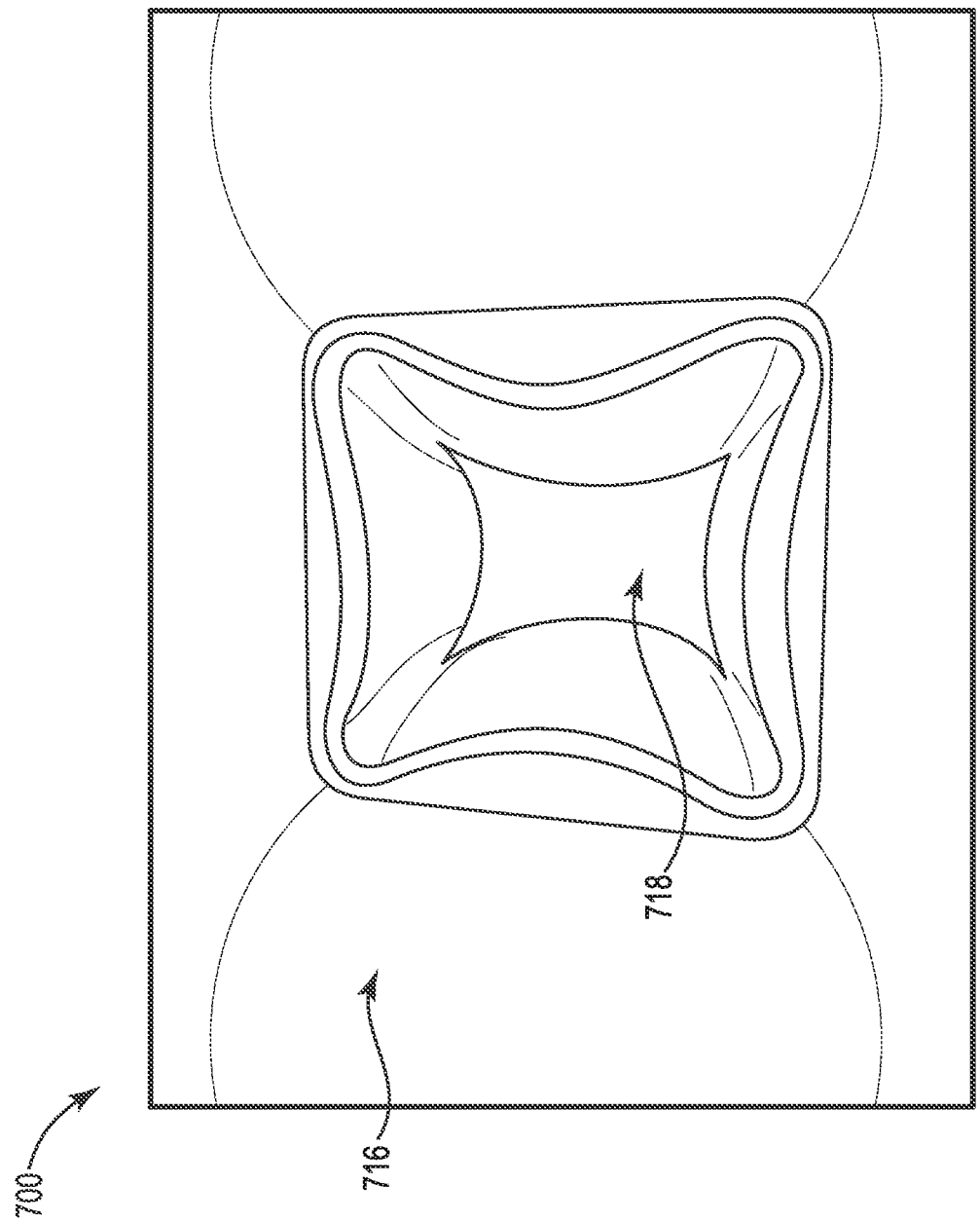
FIG. 7 is an example of a top view of a portion of a bottom surface of a mat for bowls including a cavity in accordance with one or more embodiments of the present disclosure.

FIG. 7 is an example of a top view of a portion of a bottom surface of a mat 700 for bowls including a cavity 718 in accordance with one or more embodiments of the present disclosure. As shown in FIG. 7, the mat 700 can include a bottom surface 716 and a cavity 718.

As previously described in connection with FIG. 4, the extension member (e.g., not illustrated in FIG. 7) can be continuously connected to the planar portion (e.g., not illustrated in FIG. 7), the first shell structure (e.g., not illustrated in FIG. 7), and the second shell structure (e.g., not illustrated in FIG. 7) to form the cavity 718. As illustrated in FIG. 7, when viewed from the bottom, the cavity 718 can be of a curvilinear rectangular cross-sectional shape (e.g., a rectangle with inwardly curved sides). However, embodiments of the present disclosure are not so limited. For example, the cavity 718 can be shaped differently based on the shape of the extension member, as previously described in connection with FIG. 4.

Figure 8:
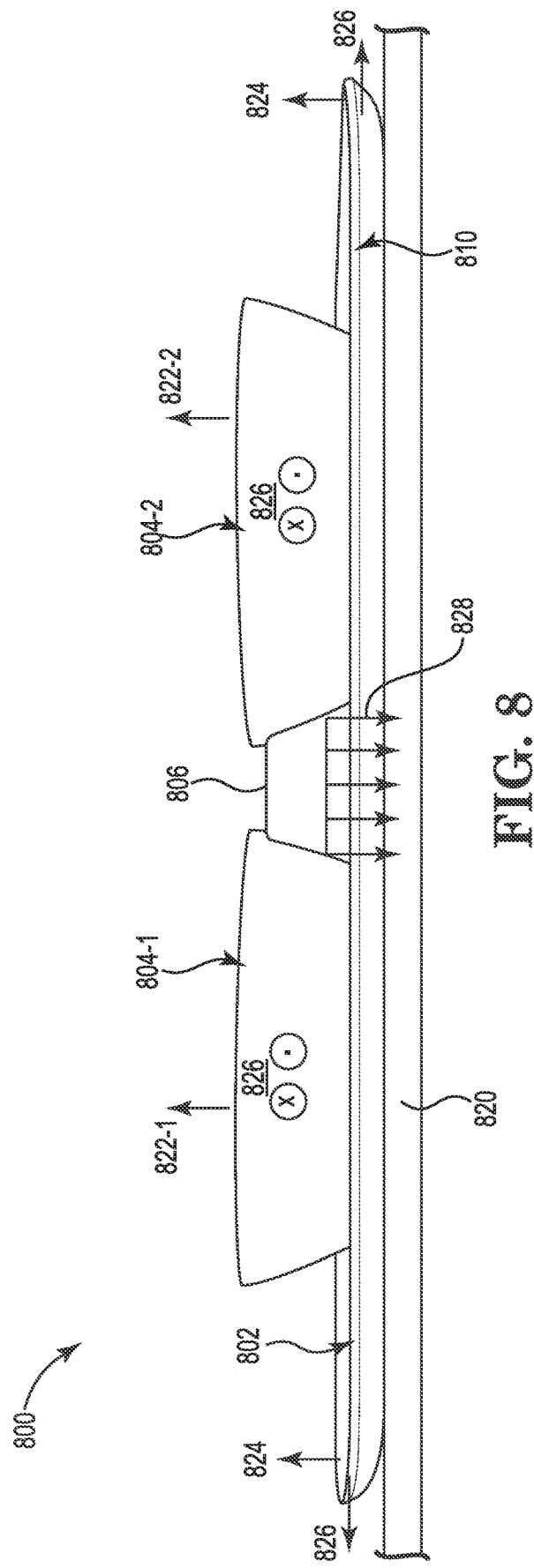
FIG. 8 is an example of a side view of a mat for bowls experiencing various forces in accordance with one or more embodiments of the present disclosure.

FIG. 8 is an example of a side view of a mat 800 for bowls experiencing various forces in accordance with one or more embodiments of the present disclosure. As shown in FIG. 8, the mat 800 can include a planar portion 802, a first shell structure 804-1, a second shell structure 804-2, and an extension member 806. The planar portion 802 can include a raised perimeter 810.

As illustrated in FIG. 8, the mat 800 can be in contact with an underlying surface 820. As used herein, the term "underlying surface" refers to a surface on which the mat 800 is located. For example, the underlying surface 820 can be a floor (e.g., or any other surface on which the mat 800 can be located). The underlying surface 820 can be, in some examples, a surface on which the mat 800 is located such that an animal can consume food and/or liquid from bowls located in the first shell structure 804-1 and/or 804-2, respectively.

In response to the mat 800 being located on the underlying surface 820, a partial vacuum can be created in the cavity. As used herein, the term "vacuum" refers to an enclosed space from which gas (e.g., air) has been partially removed such that the gas remaining in the enclosed space exerts less pressure than the atmosphere. For example, the cavity can be an enclosed space in which the air has been partially evacuated (e.g., as a result of the mat 800 being located on the underlying surface 820) such that a partial vacuum force 828 is created. The partial vacuum force 828 can restrict lateral displacement of the mat 800, as well as vertical displacement in some areas, as is further described herein.

Lateral displacement of the mat 800 can be restricted by the partial vacuum in the cavity. That is, the partial vacuum force 828 can restrict lateral displacement of the mat 800. For example, the mat 800 may experience a lateral force 826. The lateral force 826 may be the result of, for instance, an animal such as a dog pushing the mat 800 in a particular direction (e.g., sideways as oriented in FIG. 8) while eating and/or drinking from bowls located in the first shell structure 804-1 and/or the second shell structure 804-2. As illustrated in FIG. 8, a lateral force may be experienced by the mat 800 in a direction "into" the page as oriented in FIG. 8, which is illustrated by a dot enclosed by a circle, and a lateral force may be experienced by the mat 800 in a direction "out of" the page as oriented in FIG. 8, which is illustrated by an "X" enclosed by a circle. Further, a lateral force may be experienced by the mat 800 in a direction to the "right" or to the "left", as illustrated by the force arrows on the right and left of the mat 800, respectively.

As a result of the mat 800 experiencing a lateral force 826, lateral displacement of the mat 800 can be restricted as a result of the partial vacuum created by the cavity in response to the mat 800 being in contact with the underlying surface 820. For example, the partial vacuum force 828 can create a force with a magnitude that is greater than the lateral force 826, preventing the mat 800 from being laterally displaced (e.g., moved) from its location on the underlying surface 820. Accordingly, the mat 800 can prevent a lateral force imparted on the mat 800 by, for example, an animal eating and/or drinking from bowls located in the first shell structure 804-1 and/or the second shell structure 804-2, from moving the mat 800 around on the underlying surface 820.

Although the mat 800 is described above and illustrated in FIG. 8 as experiencing a lateral force 826 "into" the page, "out of" the page, to the "left", and/or to the "right", embodiments of the present disclosure are not so limited. For example, the mat 800 may experience a lateral force in a direction between that of "into" the page, "out of" the page, to the "left", and/or to the "right", and the mat 800 can restrict lateral displacement when a partial vacuum is created in response to the mat 800 being in contact with the underlying surface 820.

As described above, in response to the mat 800 being located on the underlying surface 820, the partial vacuum can be created in the cavity. Vertical displacement of the mat 800 can be restricted by the partial vacuum in the cavity when the mat 800 experiences a substantially vertical pulling force in particular areas of the mat 800, as is further described herein.

In response to a substantially vertical pulling force 822-1 on the first shell structure 804-1, vertical displacement of the mat can be restricted. For example, the partial vacuum in the cavity can create a partial vacuum force 828 with a magnitude that is greater than the substantially vertical pulling force 822-1 on the first shell structure 804-1, preventing the mat 800 from being vertically displaced (e.g., moved) from its location on the underlying surface 820. Accordingly, the mat 800 can prevent a vertical force imparted on the mat 800 by, for example, an animal biting or otherwise pulling on the mat 800, from moving the mat 800 off of the underlying surface 820.

Similarly, in response to a substantially vertical pulling force 822-2 on the second shell structure 804-2, vertical displacement of the mat can be restricted. For example, the partial vacuum in the cavity can create a partial vacuum force 828 with a magnitude that is greater than the substantially vertical pulling force 822-2 on the second shell structure 804-2, preventing the mat 800 from being vertically displaced (e.g., moved) from its location on the underlying surface 820. Accordingly, the mat 800 can prevent a vertical force imparted on the mat 800 by, for example, an animal biting or otherwise pulling on the mat 800, from moving the mat 800 off of the underlying surface 820.

In response to a substantially vertical pulling force 824 on the raised perimeter 810 of the planar portion 802, vertical displacement of the mat can be allowed. For example, as a result of the location of the substantially vertical pulling force 824, the substantially vertical pulling force 824 is not opposed by the partial vacuum force 828. Accordingly, the mat 800 can be vertically displaced in response to a substantially vertical pulling force 824 on the raised perimeter 810. Accordingly, the mat 800 can be moved by, for example, a caretaker of an animal in order to clean the mat 800, refill bowls located in the first shell structure 804-1 and/or 804-1 with food and/or liquid, relocate the mat 800 to a suitable location on the underlying surface 820, etc.

In such a manner, a mat for bowls according to the disclosure can allow for a mat to restrict displacement relative to an underlying surface on which the mat is located by utilizing a partial vacuum created by a cavity of the mat and the underlying surface. Restricting displacement of the mat can prevent an animal eating and/or drinking from bowls located on the mat from being able to move the mat relative to the underlying surface. However, a caretaker can easily move the mat by imparting a substantially vertical pulling force on a perimeter of the mat. Accordingly, the mat can reduce and/or prevent spills (e.g., of food and/or liquids), prevent a caretaker of an animal from having to locate the mat and/or bowls if the animal moves the mat, etc., as compared with previous approaches.

Figure 9:
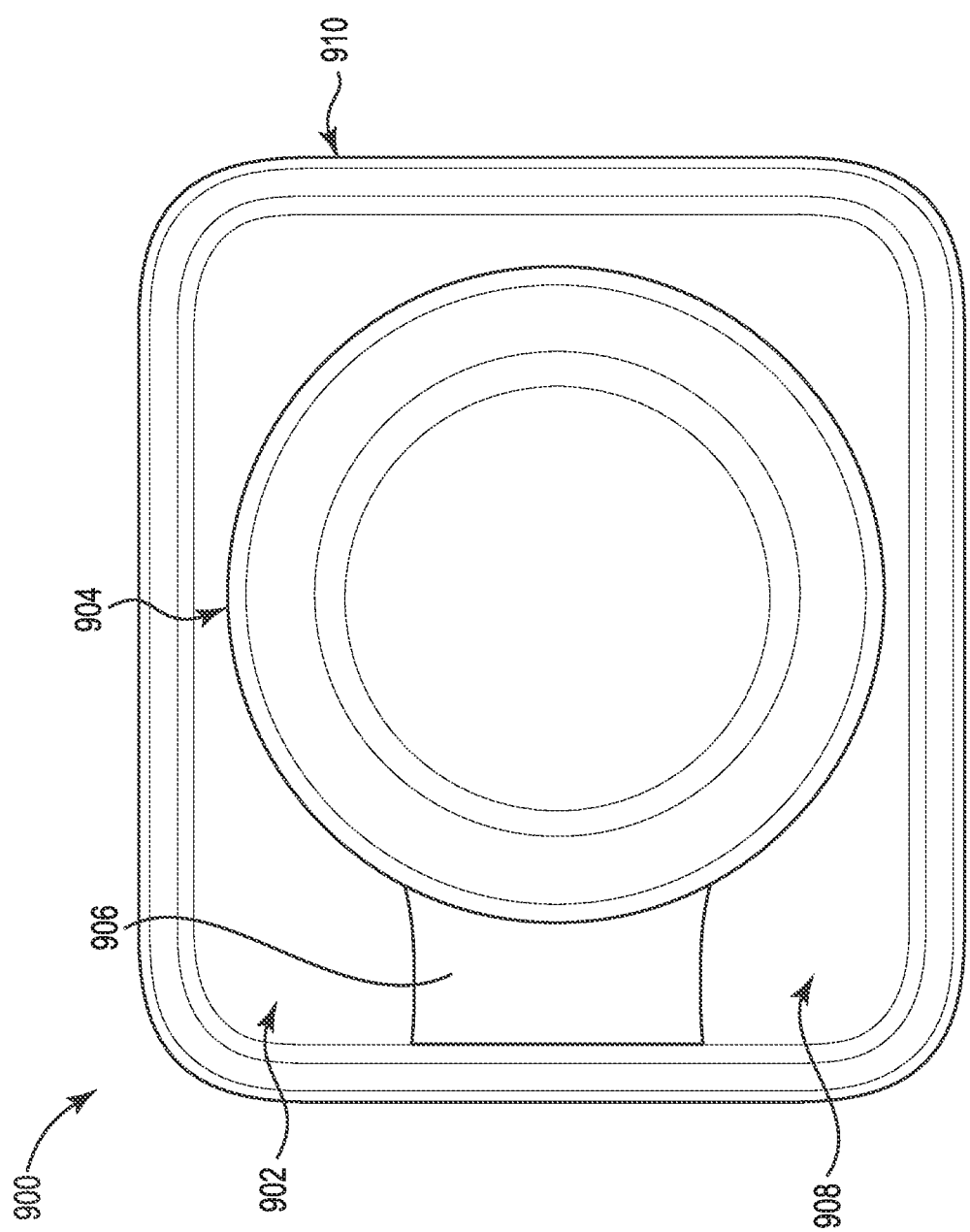
FIG. 9 is an example of a top view of a mat for bowls having a cavity to the side of a shell structure in accordance with one or more embodiments of the present disclosure.

FIG. 9 is an example of a top view of a mat 900 for bowls having a cavity to the side of a shell structure in accordance with one or more embodiments of the present disclosure. As shown in FIG. 9, the mat 900 can include a planar portion 902, a shell structure 904, and an extension member 906. The planar portion 902 can include a raised perimeter 910.

As illustrated in FIG. 9, the mat 900 can include a single shell structure 904, as compared to the mats previously described in connection with FIGS. 1-8. The shell structure 904 can be continuously connected to the planar portion 902.

The extension member 906 can be continuously connected to the shell structure 906. For example, a portion (e.g., the right portion, as oriented in FIG. 9) can be continuously connected to the shell structure 904. Further, the remaining portions of the extension member 906 can be continuously connected to the planar portion 902. Similar to the embodiment previously described in connection with FIG. 4, the extension member 906 can be of a curvilinear shape. However, embodiments of the present disclosure are not so limited. For example, the extension member 906 can be of any other shape.

The extension member 906 can be shaped to form a cavity in the mat 900. Although not illustrated in FIG. 9, when viewed from the bottom, the cavity formed by the extension member 906 can be of a curvilinear rectangular cross-sectional shape (e.g., a rectangle with inwardly curved sides). For example, the cavity formed by the extension member 906 can be similar to the cavity as previously illustrated and described in FIGS. 6 and 7. However, embodiments of the present disclosure are not so limited. For example, the cavity can be shaped differently based on the shape of the extension member 906.

In response to the mat 900 being located on an underlying surface, a partial vacuum can be created in the cavity. For example, a partial vacuum force can be created. The partial vacuum force can restrict lateral displacement of the mat 900. Further, the partial vacuum can restrict vertical displacement when the mat 900 experiences a substantially vertical pulling force on the shell structure 904, and allow vertical displacement of the mat 900 when the mat 900 experiences a substantially vertical pulling force on the raised perimeter 910 of the mat 900.

Figure 10:
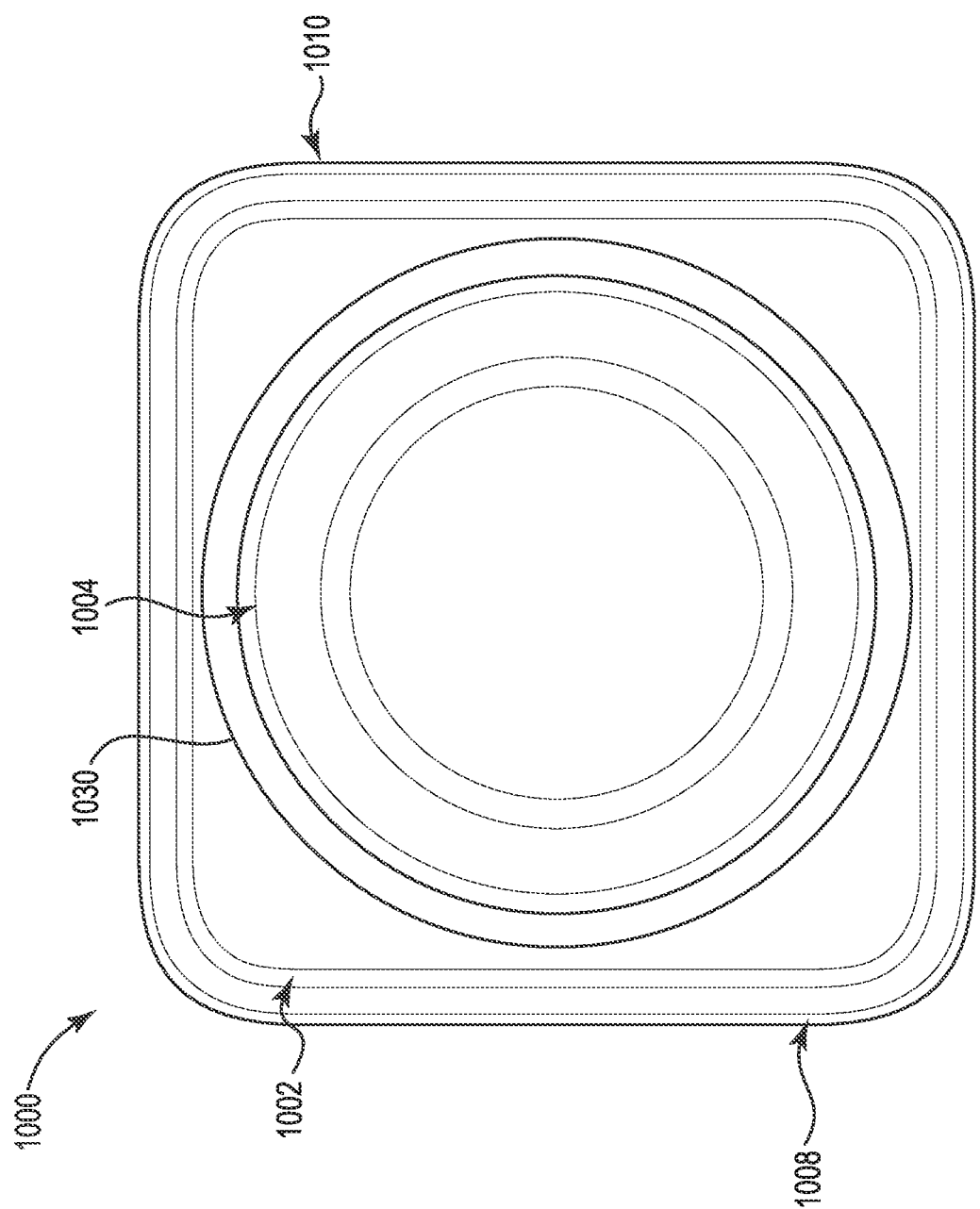
FIG. 10 is an example of a top view of a mat for bowls having a circumferential extension member around a shell structure in accordance with one or more embodiments of the present disclosure.

FIG. 10 is an example of a top view of a mat 1000 for bowls having a circumferential extension member 1030 around a shell structure 1004 in accordance with one or more embodiments of the present disclosure. As shown in FIG. 10, the mat 1000 can include a planar portion 1002, a shell structure 1004, and a circumferential extension member 1030. The planar portion 1002 can include a raised perimeter 1010.

As illustrated in FIG. 10, the mat 1000 can include a single shell structure 1004, as compared to the mats previously described in connection with FIGS. 1-8. The shell structure 1004 can be continuously connected to the planar portion 1002.

As illustrated in FIG. 10, the mat 1000 can include a circumferential extension member 1030. For example, the extension member 1030 can be of a similar shape as the shell structure 1004 and can be connected to the shell structure 1004 around a circumference of the shell structure 1004. For example, as illustrated in FIG. 10, the shell structure 1004 can be circular shaped, and the circumferential extension member 1030 can also be circularly shaped. The circumferential extension member 1030 can be continuously connected to the shell structure 1006. The circumferential extension member 1030 can be shaped to form a cavity in the mat 1000, as is further described in connection with FIG. 11.

Although the shell structure 1004 is described above as being circularly shaped, embodiments of the present disclosure are not so limited. For example, the shell structure 1004 can be in a square, rectangular, triangular, oval, irregular, and/or any other shape, and the extension member 1030 can be of a similar shape. For instance, the shell structure 1004 can be an oval shape, and the extension member 1030 can be an oval shape, etc. Further, in some examples, the shell structure 1004 and the extension member 1030 can be of different shapes.

Figure 11:
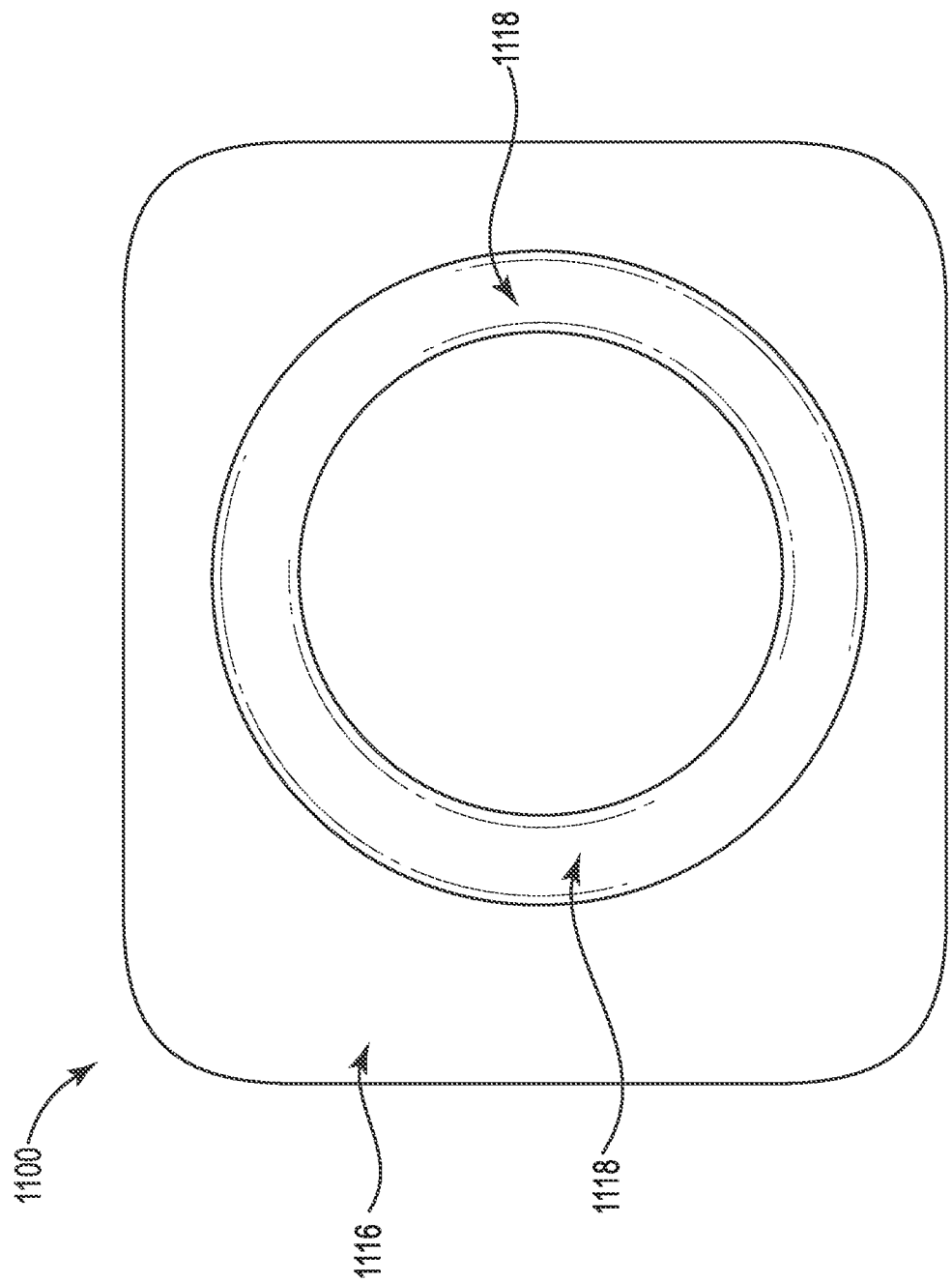
FIG. 11 is an example of a top view of a portion of a bottom surface of a mat for bowls having a circumferential cavity around a shell structure in accordance with one or more embodiments of the present disclosure.

FIG. 11 is an example of a top view of a portion of a bottom surface 1116 of a mat 1100 for bowls having a circumferential cavity 1132 around a shell structure in accordance with one or more embodiments of the present disclosure. As shown in FIG. 11, the mat 1100 can include a bottom surface 1116 and a circumferential cavity 1132.

The extension member 1006 can be shaped to form the circumferential cavity 1132. In response to the mat 1100 being located on an underlying surface, a partial vacuum can be created in the circumferential cavity 1132. For example, a partial vacuum force can be created. The partial vacuum force can restrict lateral displacement of the mat 1100. Further, the partial vacuum can restrict vertical displacement when the mat 1100 experiences a substantially vertical pulling force on the shell structure and allow vertical displacement of the mat 1100 when the mat 1100 experiences a substantially vertical pulling force on the raised perimeter of the mat 1100.

Figure 12:
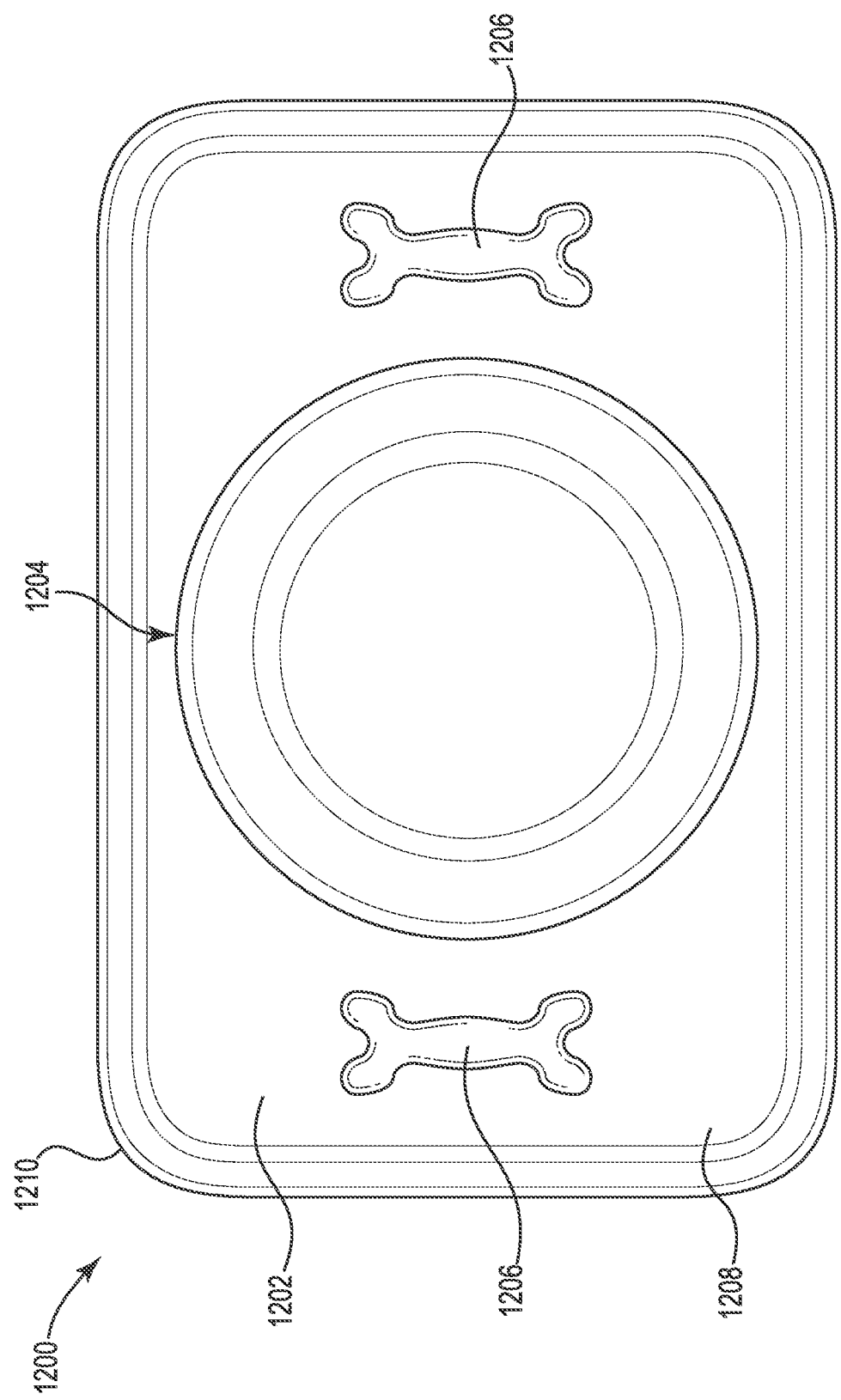
FIG. 12 is an example of a top view of a mat for bowls having extension members proximate to a shell structure in accordance with one or more embodiments of the present disclosure.

FIG. 12 is an example of a top view of a mat 1200 for bowls having extension members 1206 proximate to a shell structure 1204 in accordance with one or more embodiments of the present disclosure. As shown in FIG. 12, the mat 1200 can include a planar portion 1202, a shell structure 1204, and extension members 1206. The planar portion 1202 can include a raised perimeter 1210.

As illustrated in FIG. 12, the mat 1200 can include a single shell structure 1204, as compared to the mats previously described in connection with FIGS. 1-8. The shell structure 1204 can be continuously connected to the planar portion 1202.

The extension members 1206 can be continuously connected to the planar portion 1202 of the mat 1200. As illustrated in FIG. 12, the extension members 1206 can be in the shape of a bone. However, embodiments of the present disclosure are not so limited. For example, the extension members 1206 can be square, rectangular, triangular, circular, irregular, and/or any other shape.

In response to the mat 1200 being located on an underlying surface, a partial vacuum can be created in the cavities. For example, a partial vacuum force can be created. The partial vacuum force can restrict lateral displacement of the mat 1200. Further, the partial vacuum can restrict vertical displacement when the mat 1200 experiences a substantially vertical pulling force on the shell structure 1204, and allow vertical displacement of the mat 1200 when the mat 1200 experiences a substantially vertical pulling force on the raised perimeter 1210 of the mat 1200.

Figure 13:
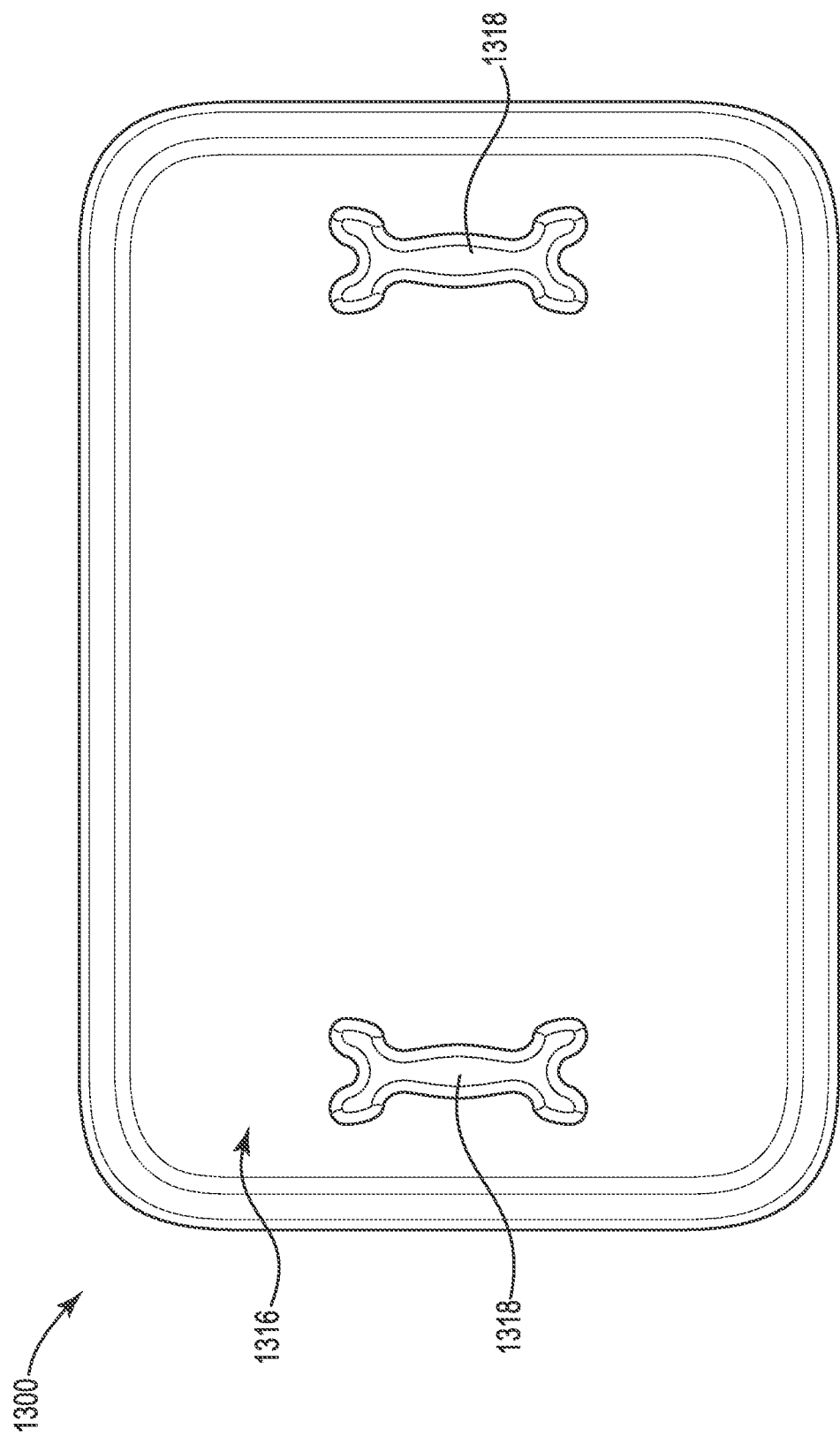
FIG. 13 is an example of a top view of a portion of a bottom surface of a mat for bowls including cavities in accordance with one or more embodiments of the present disclosure.

FIG. 13 is an example of a top view of a portion of a bottom surface of a mat 1300 for bowls including cavities 1318 in accordance with one or more embodiments of the present disclosure. As shown in FIG. 13, the mat 1300 can include a bottom surface 1316 and cavities 1318.

The extension members (e.g., extension members 1206) can be shaped to form cavities 1318 in the mat 1300. For example, the cavities 1318 formed by the extension members can be of a bone shape.

In response to the mat 1300 being located on an underlying surface, a partial vacuum can be created in the cavities 1318. For example, a partial vacuum force can be created. The partial vacuum force can restrict lateral displacement of the mat 1300. Further, the partial vacuum can restrict vertical displacement when the mat 1300 experiences a substantially vertical pulling force on the shell structure and allow vertical displacement of the mat 1300 when the mat 1300 experiences a substantially vertical pulling force on the raised perimeter of the mat 1300.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A mat, comprising:
a planar portion including a raised perimeter;
a shell structure continuously connected to the planar portion;
a first extension member shaped to form a first cavity in the mat, wherein:
the first extension member is connected to the planar portion and is spaced apart from the shell structure such that the first extension member is located between the raised perimeter and the shell structure and is not directly adjacent to the shell structure; and
the first extension member is spaced apart from the raised perimeter such that the first extension member is not directly adjacent to the raised perimeter; and
a second extension member shaped to form a second cavity in the mat, wherein:
the second extension member is connected to the planar portion and is spaced apart from the shell structure such that the second extension member is located between the raised perimeter and the shell structure and is not directly adjacent to the shell structure; and
the second extension member is spaced apart from the raised perimeter such that the second extension member is not directly adjacent to the raised perimeter;
wherein each of the first cavity and the second cavity is to cause a partial vacuum in response to the mat being in contact with an underlying surface such that lateral displacement of the mat is restricted when in contact with the underlying surface.

2. The mat of claim 1, wherein the planar portion, the shell structure, the first extension member and the second extension member are of a single continuous and unitary material.

3. The mat of claim 1, wherein the first extension member and the second extension member each includes a top portion, a first side portion, and a second side portion.

4. The mat of claim 3, wherein the top portion is continuously connected to the first side portion and the second side portion.

5. The mat of claim 3, wherein the first side portion and the second side portion are each oriented at an obtuse angle relative to a top surface of the top portion of the extension member.

6. The mat of claim 1, wherein each extension member is shaped as a bone shape.

7. The mat of claim 1, wherein each extension member is shaped as a rectangular shape.

8. The mat of claim 1, wherein each extension member is shaped as a triangular shape.

9. The mat of claim 1, wherein each extension member is shaped as a circular shape.

* * * * *